(12) United States Patent
Burns et al.

(10) Patent No.: US 8,905,385 B2
(45) Date of Patent: Dec. 9, 2014

(54) DEVICE FOR IMPROVED DELIVERY OF GAS TO FLUID

(75) Inventors: David Burns, Richmond Hill (CA); Jason Yeo, Richmond Hill (CA); Richard Lonetto, Richmond Hill (CA)

(73) Assignee: Blue Planet Environmental Inc., Richmond Hill, Ontario (CA)

( * ) Notice: Subject to any disclaimer, the term of this patent is extended or adjusted under 35 U.S.C. 154(b) by 1026 days.

(21) Appl. No.: 12/867,926

(22) PCT Filed: Feb. 23, 2009

(86) PCT No.: PCT/CA2009/000198
§ 371 (c)(1),
(2), (4) Date: Jan. 4, 2011

(87) PCT Pub. No.: WO2009/103158
PCT Pub. Date: Aug. 27, 2009

(65) Prior Publication Data
US 2011/0127682 A1  Jun. 2, 2011

Related U.S. Application Data

(60) Provisional application No. 61/030,275, filed on Feb. 21, 2008.

(51) Int. Cl.
*B01F 3/04* (2006.01)
*B01F 5/06* (2006.01)
*C02F 1/78* (2006.01)
*B01F 5/00* (2006.01)

(52) U.S. Cl.
CPC .......... *B01F 3/04503* (2013.01); *B01F 5/0657* (2013.01); *C02F 1/78* (2013.01); *B01F 5/0656* (2013.01); *C02F 2201/784* (2013.01); *B01F 5/0068* (2013.01)
USPC ....................................... 261/79.2

(58) Field of Classification Search
USPC .......................... 261/79.1, 79.2, 108
See application file for complete search history.

(56) References Cited

U.S. PATENT DOCUMENTS 1,089,406 A * 3/1914 Fitts ............................. 239/116
1,780,573 A * 11/1930 Wager ........................... 261/75

(Continued)

FOREIGN PATENT DOCUMENTS

| EP | 0 112 197 | 6/1984 |
| JP | 3-153704 | 7/1991 |
| JP | 4-322731 | 11/1992 |

OTHER PUBLICATIONS

Japanese patent document with English language abstract.

(Continued)

*Primary Examiner* — Charles Bushey
(74) *Attorney, Agent, or Firm* — Faegre Baker Daniels LLP (57) ABSTRACT

The device is of the frustum dispersion type having a housing forming a conical cavity, sealed at its large end, tapering to a discharge orifice at the other end. There is a fluid inlet, which tangential to the cavity near the sealed end. There is a hollow, tapered helix cut cone shape in the center of the cavity, affixed to the sealed end, with the point thereof axially aligned with the discharge orifice to help enable the continuous swirling motion of the contained fluid and to act as a gas inlet port to start the formation of a gas vortex. As fluid in the cavity approaches the discharge orifice, it is accelerated because of the reduction of area inside the cavity as it tapers. The change in specific gravities between the fluid and the gas causes a swirling centrifugal force on the liquid and a centripetal inner swirling of the gas. The result is at the point of discharge, the fluid is heavily loaded with small bubbles of gas.

18 Claims, 7 Drawing Sheets

(56) References Cited

U.S. PATENT DOCUMENTS

| | | | | |
|---|---|---|---|---|
| 1,816,528 | A | * | 7/1931 | Haysel ................ 261/79.1 |
| 1,840,840 | A | * | 1/1932 | Goldsborough ......... 261/79.1 |
| 2,040,185 | A | * | 5/1936 | Riall .................. 261/79.1 |
| 2,776,862 | A | * | 1/1957 | Bloom ................. 239/116 |
| 2,886,297 | A | * | 5/1959 | Crandall ............. 366/76.91 |
| 3,332,231 | A | * | 7/1967 | Walsh ................... 60/274 |
| 3,395,899 | A | * | 8/1968 | Kopa ..................... 261/22 |
| 3,584,701 | A | | 6/1971 | Freeman |
| 3,692,245 | A | * | 9/1972 | Needham et al. ......... 239/488 |
| 4,344,711 | A | | 8/1982 | Kendall et al. |
| 4,522,504 | A | | 6/1985 | Greverath |
| 5,599,513 | A | | 2/1997 | Masaki et al. |
| 5,770,062 | A | | 6/1998 | Isbell |
| 6,103,128 | A | | 8/2000 | Koso et al. |
| 7,547,002 | B2 | * | 6/2009 | Mao et al. ............. 261/78.1 |
| 2002/0066489 | A1 | | 6/2002 | Kampe |
| 2011/0115105 | A1 | * | 5/2011 | Burns et al. ................ 261/76 |
| 2011/0127682 | A1 | | 6/2011 | Burns et al. |

OTHER PUBLICATIONS

International Search Report dated Jul. 21, 2009 in International Application No. PCT/CA2009/000637.
Office Action dated Oct. 3, 2013 in U.S. Appl. No. 12/991,046.
Amendment dated Mar. 4, 2014 in U.S. Appl. No. 12/991,046.
International Search Report dated Jul. 8, 2009 in corresponding PCT International Application No. PCT/ CA2009/000198.
Notice of Allowance dated Mar. 18, 2014 in U.S. Appl. No. 12/991,046.
Notice of Allowance dated Jun. 24, 2013 in U.S. Appl. No. 12/991,046.

* cited by examiner

DEVICE FOR IMPROVED DELIVERY OF GAS TO FLUID

CROSS-REFERENCE TO RELATED APPLICATION

This application is related to and claims the benefit under 35 U.S.C. §119 and 35 U.S.C. §365 of International Application No. PCT/CA2009/000198/, filed Feb. 23, 2009, which claims the priority to U.S. provisional Ser. No. 61/030,275, filed Feb. 21, 2008, the contents of which are hereby incorporated by reference.

FIELD OF THE INVENTION

This invention relates to a device for improved delivery of gas to fluid. A particularly desirable application of this invention is for the delivery of ozone into water for consumption or for above ground pools for sterilization.

BACKGROUND OF INVENTION

The general need for reduction of chemical water treatment to preserve and rehabilitate the environment is now at the forefront of scientific analysis. The growing need for potable water is quickly reaching a crisis level in many parts of the developed world. Thus there is a need for an improved device for delivery of gases into fluid.

SUMMARY OF THE INVENTION

In accordance with an aspect of the invention there is provided a device for diffusion of gas into liquid comprising an outer housing of hollow frustum shape having a central axis, extending from a small diameter fluid outlet end, defining a fluid outlet opening, to a large diameter end; a fluid inlet port for delivery formed in said housing for delivery of fluid into said hollow housing; a helically cut conical member ("also referred to as a Unicorn") positioned and affixed within the hollow center of the housing with its axis aligned with that of the hollow frustum shape such that fluid delivered into the housing forms a swirling motion around the outside of the member as it passes from inlet to outlet, said housing having a gas inlet for delivery of gas to the fluid within the housing as it moves from inlet to outlet opening.

In accordance with a further aspect of the invention, the Device is of the frustum dispersion type having a housing forming a conical cavity, sealed at its large end, tapering to a discharge orifice at the other end. There is a fluid inlet, which is preferably tangential to the cavity near the sealed end. There is a hollow, tapered helix cut cone shape in the center of the cavity, preferably affixed to the sealed end, with the point thereof axially aligned with the discharge orifice to help enable the continuous swirling motion of the contained fluid and to act as a gas inlet port to start the formation of a gas vortex. The Device's fluid inlet receives fluid which may be from a pumped source causing a fluid rotation inside the cavity. The fluid progressively gets pushed towards the discharge end due to inflow from the pump. As the fluid in the cavity approaches the discharge orifice, it is accelerated because of the reduction of area inside the cavity as it tapers. The change in specific gravities between the fluid and the gas causes a swirling centrifugal force on the liquid and a centripetal inner swirling of the gas. The difference in swirling speeds between the two cause collision and shear between the fluid and gas. The net result is at the point of discharge, the fluid is heavily loaded with small bubbles of gas.

In the case of the invention described herein, one purpose is to reduce the amount of chlorine and other treatment chemicals used and disposed of in municipal works or public waterways.

In accordance with an aspect of the herein invention, the Device not only adapts environmentally friendly ozone as the sterilization gas, but infuses it in a manner that produces fine bubbles that ensure adequate contact with the fluid body.

The Device incorporates a helical cut or spiral cone feature in the center of the frusta cavity, attached to the large diameter end of the frustum, to maximize the gas infusion and swirling motion of the fluid mass.

The Device is capable of making a bubble so small that its buoyant tendency is outweighed by the column of water above it, leading to extended periods of submersion in the fluid. This provides superior contact time between the fluid and the gas over devices known in the art.

BRIEF DESCRIPTION OF THE DRAWINGS

Reference to an example embodiment of the invention will now be made in the accompanying drawings in which.

DETAILED DESCRIPTION OF EXAMPLE EMBODIMENTS OF THE INVENTION

In the embodiments of the Device (1) illustrated in the Figures, the Device is made of plastic, resembling a cone with a fluid inlet (10) and discharge (12), a gas inlet (14) and an interior feature, helically cut conical member (also referred to as the Unicorn) (16), which assists in maximum pressure and velocity gradients to ensure peak efficiency of gas infusion. Other suitable materials may be used for construction.

The device is made such that under normal operation it may be submerged in the fluid body it discharges to.

Figure 1:
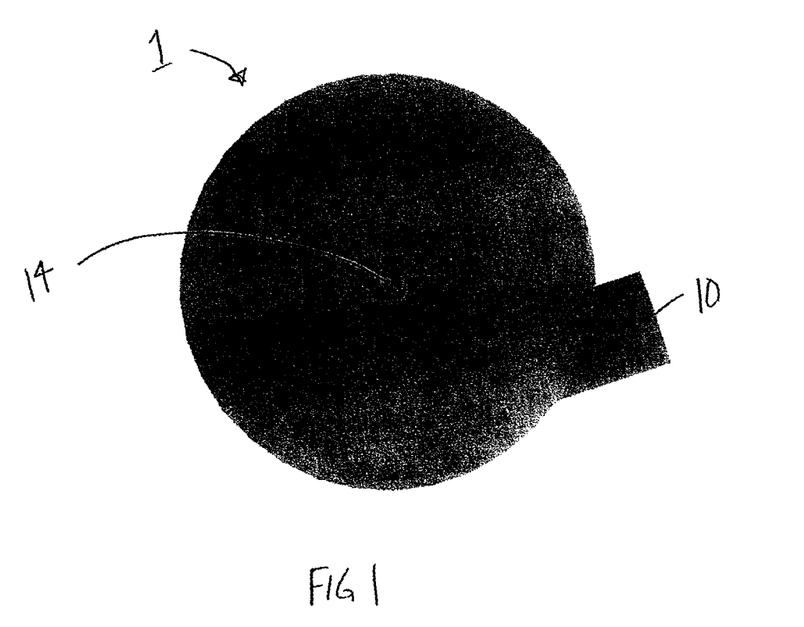
FIG. 1 is a top view of an embodiment of the invention.
Figure 2:
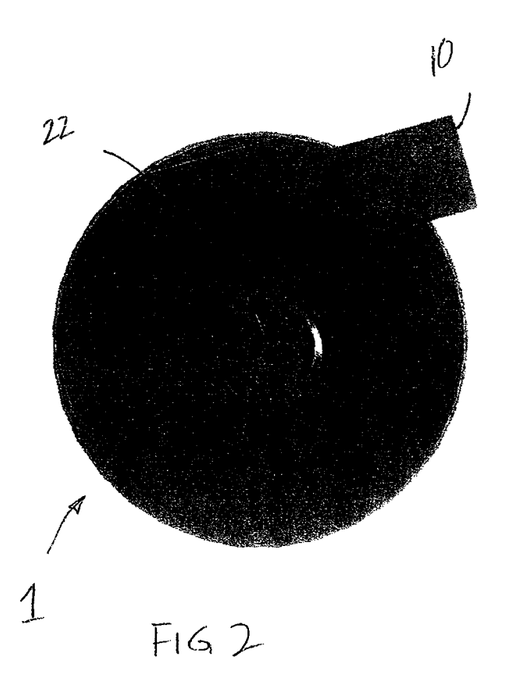
FIG. 2 is a bottom view of the embodiment of FIG. 1.
Figure 3:
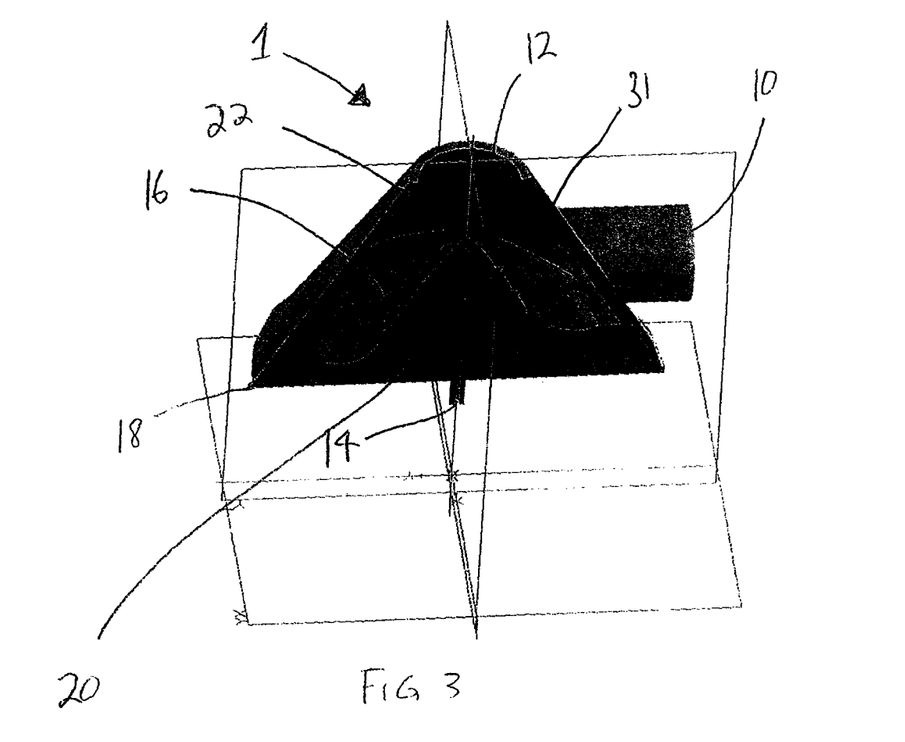
FIG. 3 is a section view of the embodiment of FIG. 1.
Figure 4:
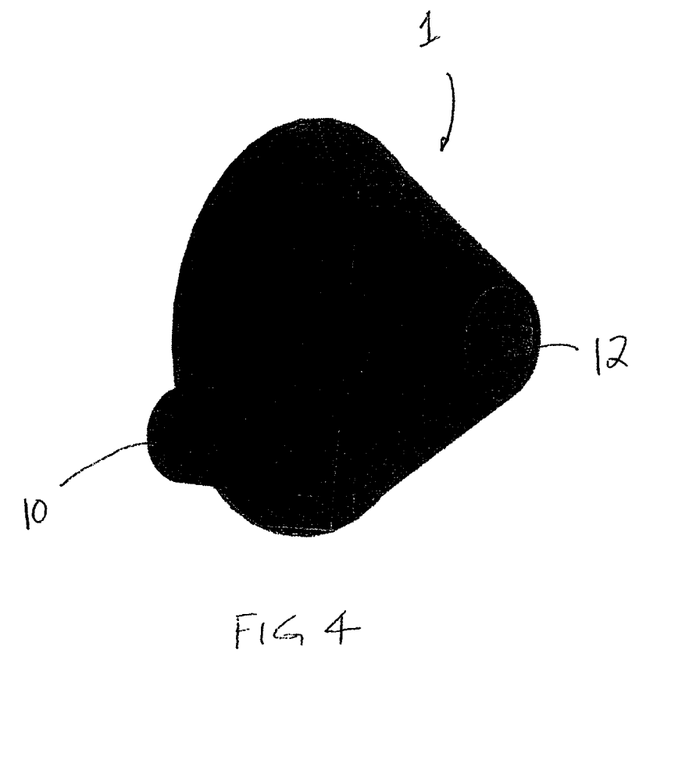
FIG. 4 is a side and bottom perspective view of the embodiment of FIG. 1.
Figure 5A:
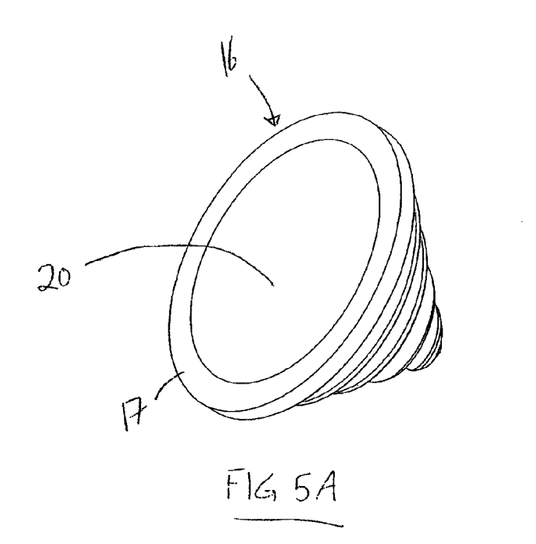
FIGS. 5a-5c are perspective, side and top views, respectively of an example Unicorn.
Figure 5B:
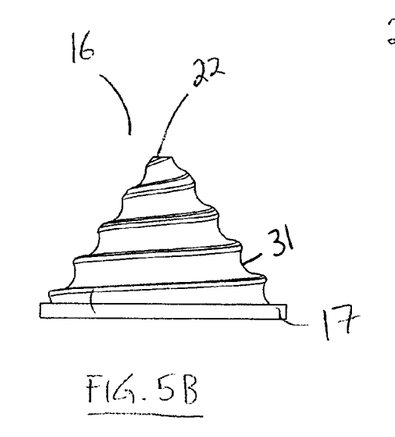
Figure 5C:
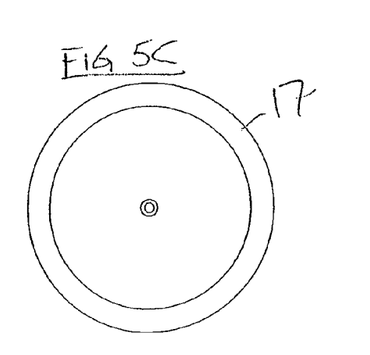
Figure 6A:
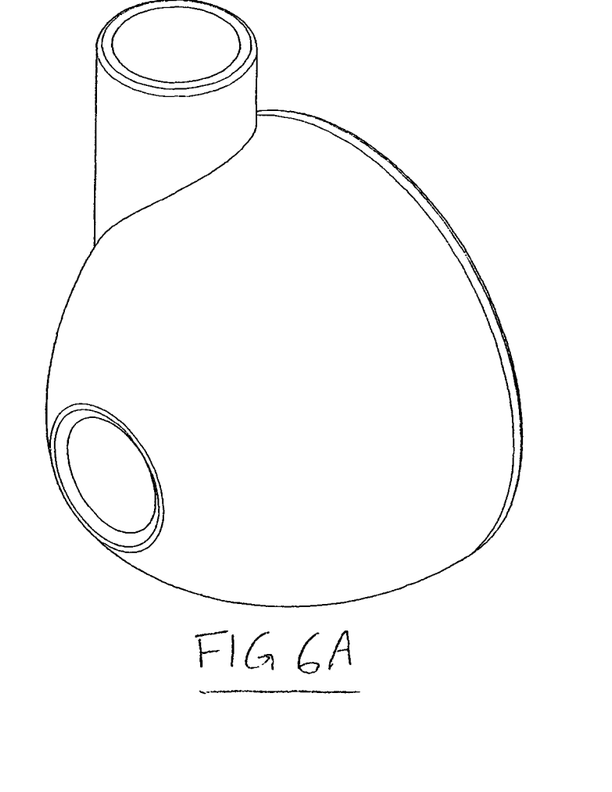
FIG. 6a-6d are perspective, side, bottom and further side views, respectively of an alternate embodiment of the invention.
Figure 6B:
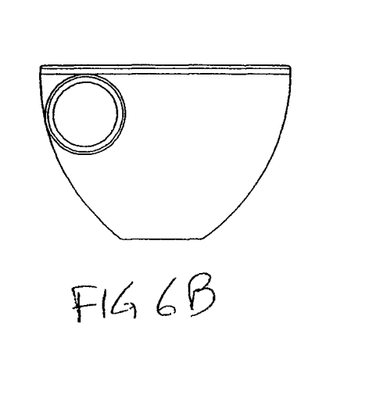
Figure 6C:
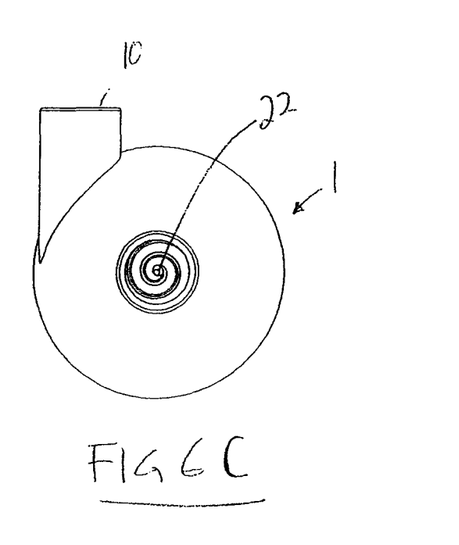
Figure 6D:
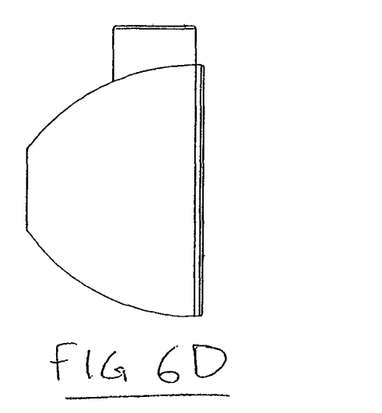
Figure 7:
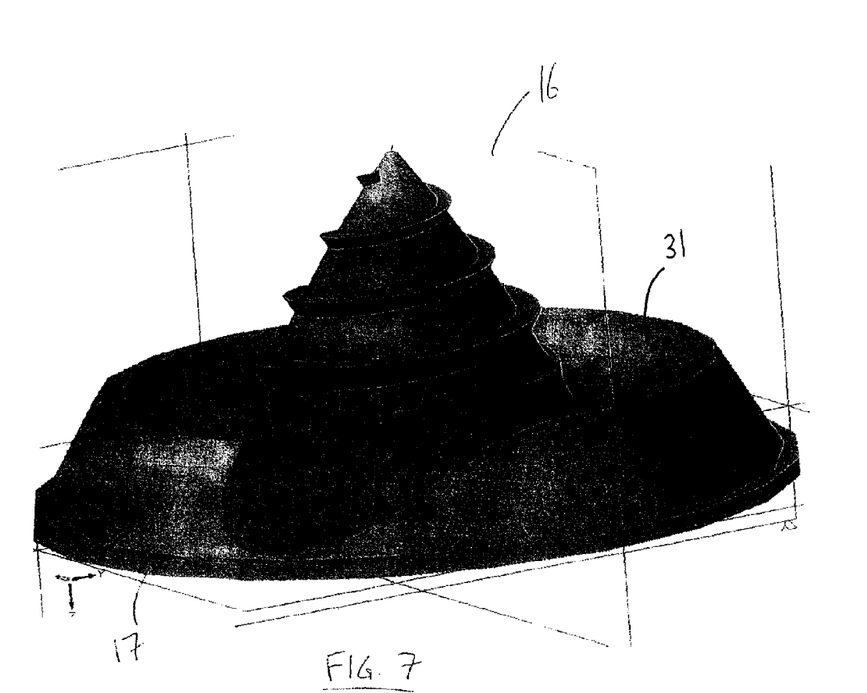
FIG. 7 is a further perspective view of an example Unicorn.

The device main shape is a frustum, with the smallest end acting as the discharge end, defining an outlet port. The axis of rotation is defined by the line drawn through the center of both parallel ends of the frustum. FIG. 4 shows a preferred ratio of frustum large diameter, small diameter and inlet, outlet size ratios for ideal injection of gas. It should be understood that variations in these ratios are contemplated by the herein invention.

The discharge orifice can be equal in size to the inlet pipe or it can be of another dimension. An example embodiment includes a discharge orifice that is 25% smaller than the inlet diameter.

The inlet pipe can be of any size, but an example embodiment is 35% of the large end base (17) diameter (18) of the frustum. Under different inlet and outlet conditions the unit will continue to function, but efficiency will be compromised.

In an example embodiments shown, the inlet pipe is within 3 degrees of tangential to the inner curvature of the surface (31) of the frustum. The inlet pipe is parallel to the large diameter end of the frustum. In the example embodiments, the inlet pipe enters the Device near the large end of the frustum.

While the inlet pipe must allow fluid into the main cavity, preferably it should not extend into the main cavity. Any objects other than The Unicorn in the cavity may disrupt uniform fluid flow and may lower the performance of the unit.

The main cavity of The Device serves the function of accepting the pressurized fluid such as water at its inlet and creating a rotating body of fluid about the axis of rotation that is constantly being replenished at the same rate that it discharges through the discharge orifice.

The large diameter end of The Device has an inclined ramp starting (zero elevation with respect to the large diameter end) in line with the fluid inlet. This ramp follows and fills the space between the inner surface of the frustum and the outer surface of The Unicorn. The ramp continues around until it terminates at the same point where it started (one rotation of the cavity). In the example embodiments, the total elevation of the ramp is $1/40^{th}$ of the height of The Device. Depending on configuration, other ramp tapers may be used to lesser or more effect. The ramp serves the purpose of added acceleration and swirling motion of the fluid.

The main cavity of the device is tapered such that the rotating fluid is constantly pushed towards the discharge as new fluid is received by the device. The taper of the frustum increases the velocity of the rotating fluid as it has less space to occupy the same volume of fluid.

Inside the main cavity there is a helically cut conical member ("The Unicorn" (16)) whose base (17) is directly affixed to the Devices large diameter end, co-axial with the axis of rotation. The Unicorn helps accelerate the fluid rotation and limits inner cavity turbulence which can reduce the low pressure vortex in the center of the cavity.

The Unicorn has a hollow center (20) running axially from large diameter base to the tip for the purpose of gas injection directly into the lowest pressure area inside of the cavity. The center of the Unicorn will have a opening (22) drilled therethrough to allow inlet of gas to the center of the swirling mass.

The gas will enter the Unicorn from a small hole, pipe or other feature (14) in the large diameter end of the frustum that is connected in a sealed manner to the large diameter end of the Unicorn. The gas will exit the Unicorn from the tip or small diameter end (22) of the Unicorn.

The gas supply can be connected either from a pressurized source or from one at atmospheric pressure. If the gas is connected to a pressurized source, the supply may need to be regulated to ensure optimal operation of the Device. If the gas is at atmospheric pressure, there has to be sufficient fluid supply to the device to create the low pressure vortex in the axial center of the Device to draw the gas to whatever depth the unit is running at. Typically, the device when fed with fluid at 20 psi will create 5 psi of vacuum. For every 1 psi, the unit will draw gas through 2.31 ft of fluid. The device of the herein invention uses a swirling mass of fluid to generate a low pressure area in the center of said swirling liquid to draw in gas, breaking gas into a multitude of very fine bubbles, so the increased surface area of said bubbles has a maximum potential and ability to diffuse their contained gas to the surrounding fluid they are submerged in.

It should be understood that many changes, modifications, variations and other uses and applications will become apparent to those skilled in the art after considering the specification and the accompanying drawings. Therefore, any and all such changes, modifications, variations and other uses and applications which do not depart from the spirit and the scope of the invention are deemed to be covered by the invention.

The invention claimed is:

1. A device for diffusion of gas into liquid comprising:
an outer housing of hollow frustum shape having a central axis, said axis extending from a small diameter liquid outlet end, defining a liquid outlet opening, to a large diameter end;
a liquid inlet port formed in said housing and defining a liquid inlet opening for delivery of liquid into said hollow housing;
a helically cut conical member having an inner curvature positioned and affixed within the hollow center of the housing with its axis aligned with that of the hollow frustum shape such that liquid delivered into the housing forms a swirling motion around the outside of the member as it passes from said liquid inlet opening to said liquid outlet opening,
said housing having a gas inlet for delivery of gas to the liquid within the housing as it moves from said inlet opening to said liquid outlet opening, and
the housing being sealed at its large diameter end and the liquid inlet port being positioned adjacent said large diameter end.

2. The device as recited in claim 1 wherein the liquid inlet port does not extend within the housing and is tangential to the inner curvature surface of the helically cut conical member.

3. The device according to claim 1 wherein the inlet port is within 3 degrees of tangential to the inner curvature surface of the helically cut conical member.

4. The device according to claim 1 wherein the helically cut conical member is affixed to the large diameter end, with a point thereof axially aligned with the liquid outlet opening to help enable the continuous swirling motion of the contained liquid as it passed through the inner curvature surface.

5. The device according to claim 1 wherein the inlet port receives liquid from a pumped source causing a liquid rotation inside the housing.

6. The device according to claim 1 wherein the liquid outlet opening is equal in size to the liquid inlet opening.

7. The device according to claim 1 wherein the liquid outlet opening is 25% smaller than the liquid inlet opening.

8. The device according to claim 1 wherein the inlet port is 35% of the large end diameter of the hollow frustum shaped housing.

9. The device according to claim 1 wherein the large diameter end of frustum shaped housing has defined therein an inclined ramp starting at zero elevation with respect to the large diameter end and being in line with the liquid inlet port and wherein said ramp follows and fills the space between the inner surface of the housing and the inner curvature of the helically cut conical member.

10. The device according to claim 1 wherein the helically cut conical member is affixed to the large diameter end, with a point thereof axially aligned with the liquid outlet opening to help enable the continuous swirling motion of the contained liquid as it passed through the inner curvature surface.

11. The device according to claim 2 wherein the helically cut conical member is affixed to the large diameter end, with a point thereof axially aligned with the liquid outlet opening to help enable the continuous swirling motion of the contained liquid as it passes through the inner curvature surface.

12. The device according to claim 3 wherein the helically cut conical member is affixed to the large diameter end, with a point thereof axially aligned with the liquid outlet opening to help enable the continuous swirling motion of the contained liquid as it passes through the inner curvature surface.

13. The device according to claim 1 wherein the inlet port receives liquid from a pumped source causing a liquid rotation inside the housing.

14. The device according to claim 2 wherein the inlet port receives liquid from a pumped source causing a liquid rotation inside the housing.

15. The device according to claim 3 wherein the inlet port receives liquid from a pumped source causing a liquid rotation inside the cavity housing.

16. The device according to claim 4 wherein the inlet port receives liquid from a pumped source causing a liquid rotation inside the housing.

17. The device according to claim 2 wherein the discharge liquid outlet opening is equal in size to the liquid inlet opening.

18. The device according to claim 3 wherein the liquid outlet opening is equal in size to the liquid inlet opening.

* * * * *

UNITED STATES PATENT AND TRADEMARK OFFICE
CERTIFICATE OF CORRECTION

PATENT NO. : 8,905,385 B2
APPLICATION NO. : 12/867926
DATED : December 9, 2014
INVENTOR(S) : David Burns et al.

It is certified that error appears in the above-identified patent and that said Letters Patent is hereby corrected as shown below:

In the Claims

Claim 15, Column 5, Line 9, delete "cavity"
Claim 17, Column 5, Line 13, delete "discharge"

Signed and Sealed this
Twelfth Day of May, 2015

Michelle K. Lee
*Director of the United States Patent and Trademark Office*